Sept. 14, 1954     W. L. McCLURE     2,689,153
ELEVATION OF GRANULAR SOLIDS
Filed Feb. 6, 1952
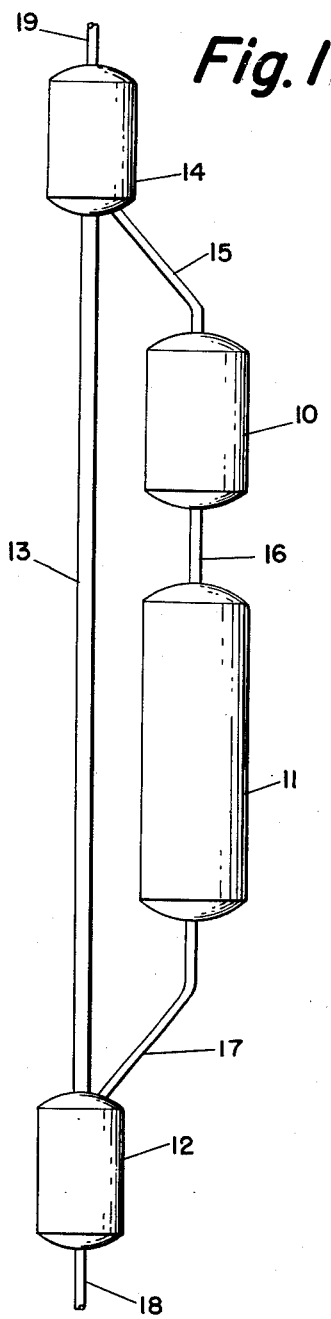
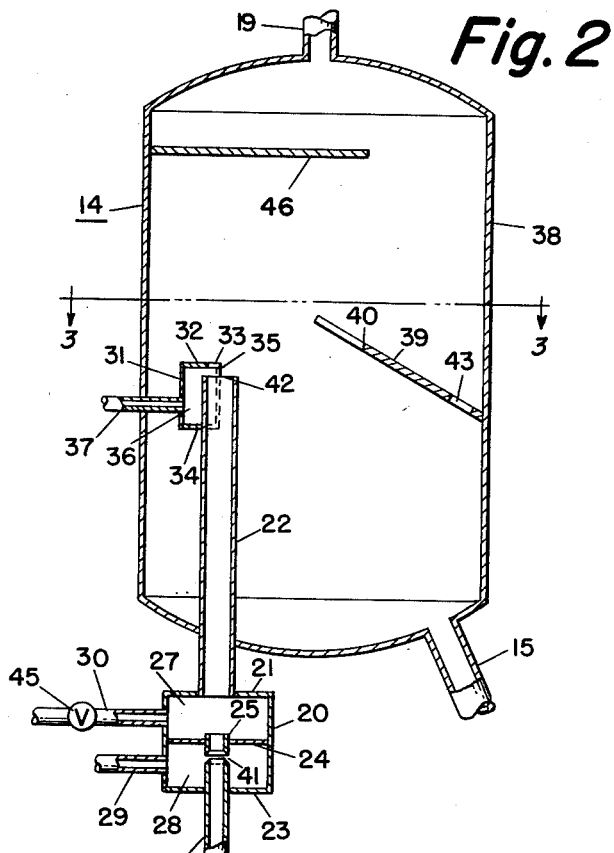
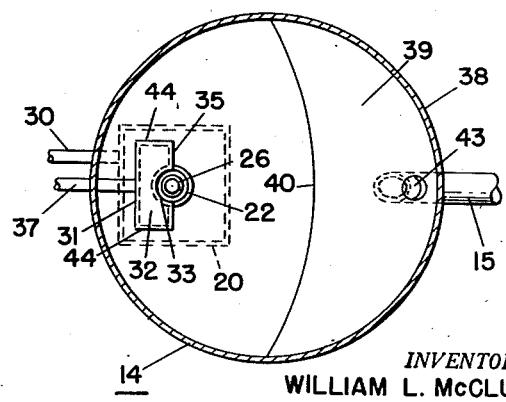
INVENTOR.
WILLIAM L. McCLURE
BY
Busser, Smith and Harding
ATTORNEYS Patented Sept. 14, 1954

2,689,153

UNITED STATES PATENT OFFICE 2,689,153

ELEVATION OF GRANULAR SOLIDS

William L. McClure, Toledo, Ohio, assignor to Sun Oil Company, Philadelphia, Pa., a corporation of New Jersey Application February 6, 1952, Serial No. 270,141

6 Claims. (Cl. 302—59)

This invention relates to the elevation of granular solids by means of a lifting gas and more particularly to the manner of terminating the elevating operation and collecting the granular solids in such a way as to minimize attrition of solids during such operation.

It is known in the art to circulate granular solids through a process system with pneumatic elevation of the solids from a low point in the system to a high point therein and with gravitation of the granular solids from the high point in the system to the low point therein. For example, in hydrocarbon conversion processes it is known to gravitate granular solids as a compact mass through a conversion zone to a low point in the system where the solids are contacted with lifting gas under pressure and elevated through a confined lift conduit to a disengaging vessel situated above the conversion zone, from which disengaging vessel the solids are again gravitated through the conversion zone.

In the utilization of granular solids in the manner above-described, a problem which is frequently encountered is that of attrition or breaking up of the solids during the lifting operation and the subsequent collection of solids in the disengaging vessel.

A significant factor contributing to such attrition is the fact that, as the solids rising in the disengager above the outlet reverse direction, they tend to fall back directly onto the solids rising from beneath, with resulting high attrition. The present invention provides a particularly effective manner of deflecting solids from a vertical path as they issue from the lift outlet, in order that impact of falling solids on rising solids is minimized or eliminated.

Another significant factor contributing to attrition is the high velocity which it is necessary to impart to the granular solids in order to elevate through the substantial vertical distances which are generally involved in the lifting operation; this high velocity causes the solids to rise to a relatively great height within the disengaging vessel above the upper outlet end of the lift conduit, and in falling back from this height onto a surface which abruptly arrests the fall of the solids, the latter undergo substantial attrition which is directly proportional to the distance through which the solids fall before having their fall abruptly arrested.

It has been proposed previously to situate within the disengaging vessel a transverse baffle adapted to interrupt the fall of the granular solids at a relatively high level in the disengager so that the solids will have fallen a relatively short distance before having their fall abruptly arrested by the baffle; the solids can then be withdrawn from above the surface of the baffle in any suitable manner for subsequent gravitation to the conversion zone. It has also been proposed to use a plurality of such baffles vertically spaced apart, each one interrupting the fall of a portion of the granular solids falling through the disengager, the lower baffles generally extending farther into the disengager and interrupting the fall of solids which have fallen past the inner surface of the higher baffles.

A difficulty which arises in the use of transverse baffles as described above resides in the fact that it is difficult to cause the solids which are introduced into the disengager and which after reversal of direction of vertical movement fall downwardly in the disengager, to be collected in suitable amounts on the transverse baffles. The solids have a tendency to fall directly downwardly in the disengager near the lift conduit from which they were discharged, rather than travelling laterally toward the transverse baffles as well as downwardly.

According to the present invention a novel apparatus and method are provided for overcoming the above-described disadvantages of prior art operation and, in one embodiment, for obtaining a manner of operation wherein granular solids are introduced onto the upper surfaces of a transverse baffle in the disengager in a particularly efficient manner capable of reducing the attrition undergone by the solids in passing through the disengager.

The invention will be further described in connection with the attached drawing. Figure 1 illustrates a solids circulation system employing a pneumatic lift for the solids. Figure 1 does not show any details of the present invention, but merely indicates the nature of a system to which the invention is advantageously applied. Figures 2 and 3 are detailed views of the disengager and lift conduit which are schematically represented in Figure 1. Figure 2 is a sectional elevational view and Figure 3 is a sectional plan view.

Turning now to Figure 1, there are shown therein reaction vessels 10 and 11, gas lift engaging vessel 12, lift conduit 13 and disengaging vessel 14. In operation granular solids are gravitated from the bottom of disengager 14 through line 15 into reaction vessel 10, which may be, for example, a hydrocarbon conversion vessel. From the bottom of vessel 10 the solids are gravitated through line 16 into reaction vessel 11 which may be, for example, a solids regeneration vessel of a conventional type. From the bottom of vessel 11 the solids are gravitated through line 17 into engaging vessel 12. Lifting gas is introduced into engager 12 through line 18 and forces granular solids upwardly from engager 12 through lift conduit 13 into disengager 14. Lifting gas is separated from granular solids in disengager 14 and is removed from disengager 14 through line 19. Granular solids are collected in the bottom of disengager 14 and are gravitated therefrom in the manner previously described.

In Figures 2 and 3 disengager 14 and lift conduit 13 and apparatus associated therewith, are illustrated in greater detail. A sleeve 20 is positioned around a portion of lift conduit 13 and spaced apart therefrom. A plate 21 is secured to the top of sleeve 20 and has a central aperture in which conduit section 22 is secured, the latter constituting an uppermost portion of lift conduit 13. A plate 23 is secured to the bottom of sleeve 20 and has a central aperture in which lower portion 26 of lift conduit 13 is secured. A plate 24 is secured to the wall of sleeve 20 and has a central aperture in which a short conduit section 25 is secured. The lower end of the wall of conduit section 25 is beveled to form an inclined surface extending upwardly and inwardly toward the axis of the conduit section. The upper end of the wall of lower portion 26 of lift conduit 13 is also beveled to provide an inclined surface extending upwardly and inwardly toward the longitudinal axis of lift conduit 13. The lower portion of conduit section 25 is spaced apart from the upper end of lower portion 26 of lift conduit 13 to provide an annular passageway 41 extending upwardly and inwardly between the beveled surfaces into lift conduit 13.

The plate 24 divides the sleeve 20 into an upper chamber 27 and a lower chamber 28. Conduit 29 communicates with lower chamber 28 and conduit 30 communicates with upper chamber 27.

Around a portion of the upper end of conduit section 22 is a wall member provided by vertical partition 31, which is spaced apart from conduit section 22, and by vertical partitions 44 secured to partition 31. Secured to the top of partitions 31 and 44 is a plate 32 having an arcuate surface 33 which is substantially directly above and congruent with the corresponding arcuate portion of the upper end of conduit section 22. Secured to the bottom of partitions 31 and 44 is a plate 34 having an arcuate surface which is secured to conduit section 22. Secured to a portion 38 of the sidewall of disengager 14 is a transverse plate 39 which is downwardly inclined toward sidewall portion 38. The inner surface 40 of transverse plate 39 is positioned outside the space enclosed by the imaginary upward projection of lift conduit 13 within disengager 14. Partitions 35, secured to opposite sides of the wall of conduit section 22 at positions substantially equidistant from inner surface 40 of transverse baffle 39, are secured at their tops and bottoms respectively to plates 32 and 34, and are also secured to vertical partitions 44. The wall provided by partitions 31 and 44 provides, with partitions 35, with plates 32 and 34, and with the wall of conduit section 22, a chamber 36 with which gas conduit 37 communicates.

In operation granular solids are propelled upwardly through lift conduit 13 by means of a lifting gas. Auxiliary gas is introduced through conduit 29 into lower chamber 28 and passes through the annular inclined passageway 41 into the stream of gas and solids passing upwardly through lift conduit 13. Impingement of such auxiliary gas upon the stream of gas and solids causes the solids in the stream to become concentrated within the center of the stream so that the stream of gas and solids rising above the point of introduction of the auxiliary gas through annular passageway 41 has a central portion which is more dense than any portion of the stream of gas and solids rising in the lower portion of lift conduit 13. In order to reduce the velocity of the gas in conduit section 22, a portion of the lifting gas and auxiliary gas is removed from upper chamber 27 through conduit 30 at a rate controlled by valve 45. A stream of deflecting gas is introduced through conduit 37 into chamber 36 and is discharged laterally into the stream of solids rising past outlet end 42 of conduit section 22. The stream of solids is thereby deflected away from lift conduit 13 and toward transverse baffle 39, and the solids are collected on baffle 39. The solids are withdrawn from above transverse baffle 39 through aperture 43 therein and are collected in the bottom of disengager 14 for subsequent gravitation through line 15. Lifting gas and deflecting gas pass upwardly around baffle 46 and are removed from disengager 14 through line 19.

According to one embodiment of the present invention it is possible to collect a greater proportion of the solids introduced into a disengaging vessel on any one transverse baffle positioned within the disengager than has been possible according to prior art operation. By concentrating solids in the center of a rising stream of gas and solids it is possible to obtain a subsequent deflecting action with a stream of deflecting gas at the lift conduit outlet, which action is more effective in directing the solids stream toward the transverse plate on which it is desired to collect the solids than the action obtained if the solids have not previously been concentrated in the center of the stream by the compressing action of a stream of auxiliary gas. Removal of a portion of the auxiliary gas and lifting gas before subjecting the rising solids stream to the action of the deflecting gas at the lift outlet, also contributes to the efficiency of the operation since it reduces the velocity of the rising stream of gas and solids and makes that stream more susceptible to the deflecting action.

As shown in the drawing, upper portion 22 of lift conduit 13 has larger cross sectional area than that of lower portion 26 of lift conduit 13, so that the gas passing through upper portion 22 has a lower velocity than it would have if upper portion 22 had equal cross sectional area to that of lower portion 26. The low gas velocity in upper portion 26 increases the effectiveness of the deflecting action obtained at the lift outlet. However, it is within the scope of the invention for upper portion 22 not to have greater cross sectional area than that of lower portion 26.

The present invention provides the advantage of deflecting solids from the vertical and preventing impingement of falling solids on rising solids, whether a transverse baffle such as the baffle 39 is employed or whether it is not. If such a baffle is used, the additional advantage, as above described, of collecting more solids on the baffle is obtained. It is to be understood that a plurality of vertically spaced baffles can be used instead of a single baffle such as that shown in the drawing.

In Figure 2, the space between the lower end of conduit section 22 and the upper end of conduit section 25 constitutes an apertured area in lift conduit 13, through which a portion of the lifting gas and auxiliary gas passing through conduit section 25 can be removed via conduit 30. Also, annular passageway 41 constitutes another apertured area in lift conduit 13 at a lower level; auxiliary gas can be introduced into lift conduit 13 through the latter apertured area. According to the invention, the lower apertured area, through which auxiliary gas is introduced into the lift conduit, is adapted to admit auxiliary gas into the lift conduit from positions around the periphery thereof; e. g. annular passageway 41 is adapted to admit auxiliary gas on the entire periphery of the lift conduit, i. e. from an infinite number of opposite positions thereon, so that auxiliary gas introduced from one such position urges solids in one direction toward the center of the stream, while auxiliary gas introduced from another, e. g. an opposite, such position, urges solids in another direction toward the center of the stream, the net effect of the total auxiliary gas used being to concentrate solids in the center of the stream. Preferably, but not necessarily, the upper apertured area is adapted to remove gas from the lift conduit from positions around the periphery thereof. It is preferred that the lower apertured area be adapted, as in annular passageway 41, to discharge gas upwardly at an angle into lift conduit 13, but such upward discharge is not essential to the invention. Any suitable apparatus providing the two apertured areas as above described can be employed; for example, instead of providing an apertured area by vertically spaced conduit sections, a plurality of perforations spaced around the conduit wall can be employed.

Removal of a portion of the lifting gas and auxiliary gas through an upper apertured area is preferred, but not necessary according to the present invention. If the upper lift conduit portion 22 has greater cross sectional area than that of the lower portion 26, the gas velocity in upper portion 22 may be no greater than that in lower portion 26, even if removal of gas through an upper apertured area is not effected. Even if the upper lift conduit portion 22 does not have greater cross sectional area than that of the lower portion 26, and gas is not removed through an upper apertured area, satisfactory operation may be obtained, the increase in velocity in upper portion 22 over that in lower portion 26 not being so great as to render the operation unsuitable.

Any suitable gas can be employed as lifting gas, auxiliary gas, and deflecting gas according to the present invention, e. g. air, steam, flue gas, hydrocarbon vapor, etc. The lifting gas, auxiliary gas, and deflecting gas can all have the same nature or they can be different from one another.

Granular solids which are elevated according to the present invention include natural and synthetic hydrocarbon conversion catalysts, e. g. clay catalyst, silica-alumina synthetic catalyst, etc., and inert, heat transfer contact material for use in thermal conversions, as well as other granular solids. Solids which are employed in moving compact bed conversion systems generally have, as freshly prepared, particle sizes within the approximate range 3–20 mesh on the U. S. Sieve Series scale.

Systems to which the present invention can advantageously be applied generally include lift conduits whose height is at least 50 times the major dimension of the lift conduit cross section at the lower end of the lift conduit. The lift conduit can be as high as desired, but generally its height will not exceed 300 times the major dimension of the lift conduit cross section at the lower end of the lift conduit. The lift conduit which is employed can have constant cross section throughout its height or, in a portion thereof or throughout its height, the lift conduit can have cross section which varies with the height. The cross sectional shape can be circular, rectangular, or any other suitable shape.

The invention claimed is:

1. Apparatus for elevating granular solids by means of a lifting gas and for collecting such solids after such elevating which comprises: an elongated substantially vertical lift conduit having an apertured area in an upper portion thereof; means for introducing gas under pressure through said apertured area into said lift conduit from positions around the periphery thereof; a disengaging vessel communicating with the upper outlet end of said lift conduit and having a sidewall horizontally spaced apart from said outlet end; and adjacent said outlet end of said lift conduit, a deflecting gas conduit adapted to discharge deflection gas laterally across said outlet end of said lift conduit and toward said sidewall of said disengaging vessel.

2. Apparatus according to claim 1 and additionally comprising a second apertured area spaced above the first-named apertured area and providing a gas outlet from said lift conduit.

3. Apparatus according to claim 1 wherein said lift conduit has greater cross sectional area in a portion thereof above said apertured area than in the portion thereof below said apertured area.

4. Apparatus according to claim 1 and additionally comprising: within said vessel and between said sidewall and the space enclosed by said lift conduit and by the imaginary upward projection of said lift conduit, a transverse baffle adapted to interrupt the fall of granular solids within said vessel, at least a portion of said baffle being positioned at a level above the level of said outlet end of said lift conduit.

5. Apparatus according to claim 1 wherein said lift conduit comprises three conduit sections vertically spaced apart, the space between the upper end of the lowermost of the three conduit sections and the lower end of the intermediate conduit section constituting said apertured area, and the space between the upper end of the intermediate conduit section and the lower end of the uppermost of the three conduit sections constituting a second apertured area providing a gas outlet from said lift conduit.

6. Apparatus for elevating granular solids by means of a lifting gas and for collecting such solids after such elevating which comprises: an elongated substantially vertical lift conduit comprising upper, intermediate, and lower conduit sections vertically spaced apart from each other, the upper end of the lower conduit section and the lower end of the upper conduit section having beveled edges providing therebetween an inwardly and upwardly inclined annular passageway into said lift conduit; a sleeve surrounding and spaced apart from the intermediate conduit section and extending upwardly at least to the level of the bottom of the upper conduit section and extending downwardly at least to the level of the top of the lower conduit section; an upper transverse plate secured to the top of said sleeve and having an aperture in which the upper conduit section is secured; an intermediate transverse plate secured to the wall of said sleeve and having an aperture in which the intermediate conduit section is secured; a lower transverse plate secured to the bottom of said sleeve and having an aperture in which the lower conduit section is secured and providing with said upper transverse plate an upper chamber in said sleeve and providing with said lower transverse plate a lower chamber in said sleeve; an auxiliary gas introducing conduit communicating with said lower chamber; a gas removal conduit communicating with said upper chamber; a disengaging vessel communicating with the upper outlet end of said lift conduit and having a sidewall horizontally spaced apart from said outlet end; within said vessel and between said sidewall and the space enclosed by said lift conduit and by the imaginary upward projection of said lift conduit, a transverse baffle adapted to interrupt the fall of granular solids within said vessel, at least a portion of said baffle being positioned at a level above the level of said outlet end of said lift conduit; secured to opposite sides of the outer wall of said lift conduit, two substantially vertical partitions extending a short distance above the outlet end of said lift conduit, said partitions being secured to said outer wall at positions substantially equidistant from the inner surface of said transverse baffle; a transverse plate secured to the top of said partitions and having an edge substantially coinciding with the imaginary upward projection of that portion of the lift conduit outlet lying between said partitions on the side opposite said transverse baffle, the last-named transverse plate being adjacent and outside the space enclosed by the imaginary upward projection of said lift conduit within said disengaging vessel; a substantially vertical wall member spaced apart from the wall of said lift conduit and secured at its top to said last-named transverse plate and secured at either end to said partitions; a transverse plate secured to the bottom of said vertical wall member and to the wall of said lift conduit and forming therewith a deflecting gas chamber; and means for introducing deflecting gas under pressure into said deflecting gas chamber.

References Cited in the file of this patent

UNITED STATES PATENTS

| Number | Name | Date |
|---|---|---|
| 1,202,088 | Murray | Oct. 24, 1916 |
| 1,391,744 | Lower | Sept. 27, 1921 |
| 2,106,869 | Falkenstein | Feb. 1, 1938 |
| 2,358,497 | Egloff | Sept. 19, 1944 |

FOREIGN PATENTS

| Number | Country | Date |
|---|---|---|
| 278,858 | Germany | July 18, 1913 |